(12) United States Patent
Hata

(10) Patent No.: US 11,894,691 B2
(45) Date of Patent: Feb. 6, 2024

(54) POWER TRANSMISSION DEVICE AND CONTACTLESS POWER FEEDING SYSTEM

(71) Applicant: Mitsubishi Electric Corporation, Tokyo (JP)

(72) Inventor: Shunji Hata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/922,036

(22) PCT Filed: Dec. 14, 2020

(86) PCT No.: PCT/JP2020/046455
§ 371 (c)(1),
(2) Date: Oct. 28, 2022

(87) PCT Pub. No.: WO2022/130439
PCT Pub. Date: Jun. 23, 2022

(65) Prior Publication Data
US 2023/0268773 A1    Aug. 24, 2023

(51) Int. Cl.
*H02J 50/12* (2016.01)
*H02J 50/70* (2016.01)
(52) U.S. Cl.
CPC .............. *H02J 50/12* (2016.02); *H02J 50/70* (2016.02)
(58) Field of Classification Search
CPC .................................. H02J 50/00; H02J 50/12
See application file for complete search history.

(56) References Cited

U.S. PATENT DOCUMENTS

| | | | | |
|---|---|---|---|---|
| 2011/0278949 A1* | 11/2011 | Tsai | .................. | H02J 50/70 307/104 |
| 2012/0038218 A1* | 2/2012 | Ichikawa | ............... | H02J 50/70 307/104 |

(Continued)

FOREIGN PATENT DOCUMENTS

| | | |
|---|---|---|
| JP | 5093386 B2 | 12/2012 |
| JP | 2019-68580 A | 4/2019 |

(Continued)

OTHER PUBLICATIONS

International Search Report and Written Opinion dated Feb. 2, 2021 received for PCT Application PCT/JP2020/046455, Filed on Dec. 14, 2020, 8 pages including English Translation.

*Primary Examiner* — Rexford N Barnie
*Assistant Examiner* — Joseph N Inge
(74) *Attorney, Agent, or Firm* — XSENSUS LLP

(57) ABSTRACT

A contactless power feeding system includes: a power converter which converts DC power from a DC power supply, to AC power; a power transmission electrode to which AC power converted by the power converter is applied; a power reception device having a power reception electrode, receiving power through capacitive coupling between the power transmission and reception electrodes, and feeding power to a load; a voltage detection unit which detects voltage of the power transmission electrode; and a control unit which controls the DC power supply or the power converter using voltage detected by the voltage detection unit. The voltage detection unit has a voltage detection electrode and detects voltage of the power transmission electrode through capacitive coupling between the power transmission electrode and the voltage detection electrode.

20 Claims, 5 Drawing Sheets

(56) References Cited

U.S. PATENT DOCUMENTS

| | | | | |
|---|---|---|---|---|
| 2012/0049640 A1* | 3/2012 | Ichikawa | ............ | H02J 50/12 |
| | | | | 307/99 |
| 2013/0187479 A1* | 7/2013 | Tsuchiya | ............ | H02J 50/12 |
| | | | | 307/109 |
| 2014/0375251 A1* | 12/2014 | Sakai | ............ | H02M 7/537 |
| | | | | 307/149 |
| 2015/0326033 A1* | 11/2015 | Ichikawa | ............ | H02J 50/12 |
| | | | | 307/104 |
| 2016/0072311 A1* | 3/2016 | Kato | ............ | H02J 50/05 |
| | | | | 307/104 |
| 2019/0103769 A1* | 4/2019 | Sugino | ............ | B65G 43/00 |
| 2022/0376550 A1* | 11/2022 | Kim | ............ | H02J 50/05 |

FOREIGN PATENT DOCUMENTS

| | | |
|---|---|---|
| JP | 2019-97297 A | 6/2019 |
| JP | 2020-137180 A | 8/2020 |

\* cited by examiner

POWER TRANSMISSION DEVICE AND CONTACTLESS POWER FEEDING SYSTEM

CROSS-REFERENCE TO RELATED APPLICATION

The present application is based on PCT filing PCT/JP2020/046455, filed Dec. 14, 2020, the entire contents of which are incorporated herein by reference.

TECHNICAL FIELD

The present disclosure relates to a power transmission device and a contactless power feeding system.

BACKGROUND ART

As an example of technology for transmitting power in a contactless manner, a method using capacitive coupling between a power transmission electrode and a power reception electrode is known. In a power feeding system using this method, first, inputted DC power is converted to AC power by a power converter, and capacitive coupling present between power transmission electrodes and an inductor connected in series to the power transmission electrode are resonated to generate high voltage at the power transmission electrode. Then, the generated voltage is supplied to a power reception device through capacitive coupling between the power transmission electrode and the power reception electrode, whereby power is transmitted.

In a case of feeding power to a power reception device with a load state varying, voltage outputted to the load varies depending on the load state. Therefore, in order to keep the voltage outputted to the load constant, it is necessary to recognize the load state and control output power of a power converter in accordance with the load state (see, for example, Patent Document 1).

In a power transmission system disclosed in Patent Document 1, voltage between two power transmission electrodes is capacitive-divided, the load state is recognized from the capacitive-divided AC voltage, and a power transmission circuit is drive-controlled so that power transmission efficiency increases, on the basis of the load state.

CITATION LIST

Patent Document

Patent Document 1: Japanese Patent No. 5093386

SUMMARY OF THE INVENTION

Problems to be Solved by the Invention

In the method disclosed in Patent Document 1 in which voltage between two power transmission electrodes is capacitive-divided and the capacitive-divided voltage is detected, normally, a capacitor which is a passive component is interposed, so that a resonance condition in the power transmission circuit is influenced and changed. In addition, in a case of making capacitive voltage division by a series capacitor, there is an influence of a parasitic inductance or variation in capacitive characteristics of the capacitor. Because of such factors, it is difficult to detect voltage accurately and therefore it might be impossible to perform proper control while recognizing the load state on the power reception side.

The present disclosure has been made to solve the above problem, and an object of the present disclosure is to provide a power transmission device and a contactless power feeding system that can properly control power to be supplied to a power reception device.

Solution to the Problems

A power transmission device according to the present disclosure is a power transmission device for supplying power in a contactless manner to a power reception device having a power reception electrode, the power transmission device including: a DC power supply which outputs DC power; a power converter which converts the DC power outputted from the DC power supply, to AC power; a power transmission electrode to which the AC power converted by the power converter is applied; a voltage detection unit which detects voltage of the power transmission electrode; and a control unit which controls the DC power supply or the power converter on the basis of the voltage detected by the voltage detection unit. Power is supplied to the power reception device through capacitive coupling between the power transmission electrode and the power reception electrode. The voltage detection unit has a voltage detection electrode and detects the voltage of the power transmission electrode through capacitive coupling between the power transmission electrode and the voltage detection electrode.

A contactless power feeding system according to the present disclosure includes: a DC power supply which outputs DC power; a power converter which converts the DC power outputted from the DC power supply, to AC power; a power transmission electrode to which the AC power converted by the power converter is applied; a power reception device which has a power reception electrode placed so as to be opposed to the power transmission electrode, and which receives power through capacitive coupling between the power transmission electrode and the power reception electrode and feeds power to a load; a voltage detection unit which detects voltage of the power transmission electrode; and a control unit which controls the DC power supply or the power converter on the basis of the voltage detected by the voltage detection unit. The voltage detection unit has a voltage detection electrode and detects the voltage of the power transmission electrode through capacitive coupling between the power transmission electrode and the voltage detection electrode.

Effect of the Invention

The power transmission device and the contactless power feeding system according to the present disclosure can properly control power to be supplied to a power reception device.

DESCRIPTION OF EMBODIMENTS

Figure 1:
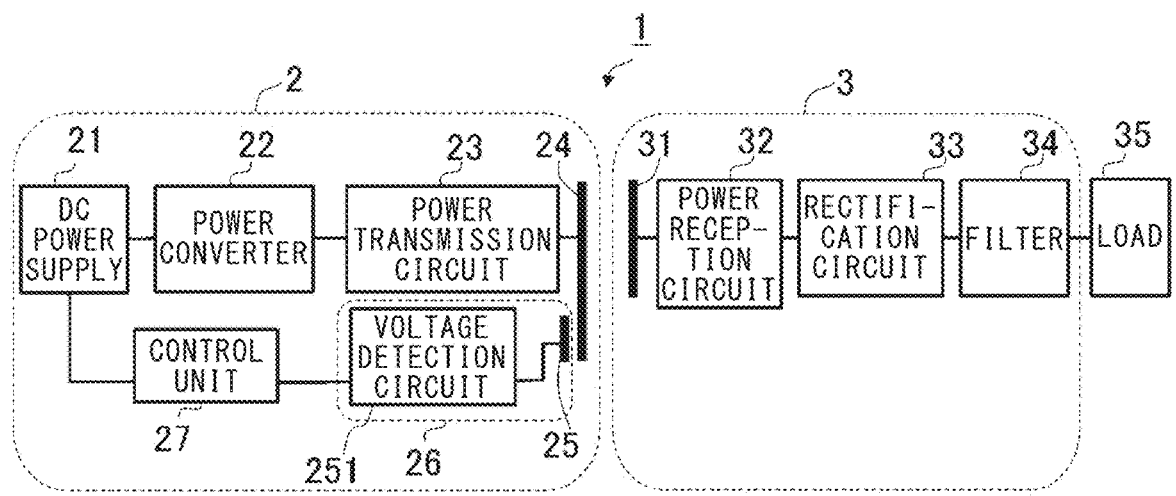
FIG. 1 is a function block diagram showing the configuration of a contactless power feeding system according to embodiment 1.

Hereinafter, embodiments will be described with reference to the drawings. In the drawings, the same reference characters denote the same or corresponding parts.

Embodiment 1

Hereinafter, a contactless power feeding system according to embodiment 1 will be described with reference to the drawings. First, the configuration of a contactless power feeding system 1 according to embodiment 1 will be described.

<Configuration of Contactless Power Feeding System 1>

FIG. 1 is a function block diagram showing the configuration of the contactless power feeding system 1 according to embodiment 1. The contactless power feeding system 1 includes a power transmission device 2, a power reception device 3, and a load 35 supplied with power from the power reception device 3.

The power transmission device 2 includes a DC power supply 21, a power converter 22, a power transmission circuit 23, a power transmission electrode 24, a voltage detection unit 26, and a control unit 27.

The DC power supply 21 includes a DC/DC converter formed by a switching circuit as an example, converts voltage of DC power inputted from outside, and outputs the DC power converted to predetermined voltage. Through ON/OFF operation of a switch element of the switching circuit, voltage to be outputted from the DC power supply 21 is determined.

The power converter 22 includes a class-E inverter or an inverter formed by a bridge circuit as an example, converts DC power outputted from the DC power supply 21 to AC power, and outputs the converted AC power. In the present embodiment, the power converter 22 is a power supply that outputs high-frequency voltage or high-frequency current, and the output waveform thereof may be a waveform such as a rectangular wave shape including a plurality of frequency components.

The power transmission circuit 23 receives AC power outputted from the power converter 22 and generates resonant voltage at the power transmission electrode 24. The details of the power transmission circuit 23 will be described later.

The voltage detection unit 26 includes a voltage detection electrode 25 and a voltage detection circuit 251, and detects voltage of the power transmission electrode 24 by using capacitive coupling between the power transmission electrode 24 and the voltage detection electrode 25. The details of the voltage detection circuit 251 will be described later.

The control unit 27 controls the DC power supply 21 on the basis of the voltage detected by the voltage detection unit 26.

The power reception device 3 includes a power reception electrode 31, a power reception circuit 32, a rectification circuit 33, and a filter 34.

When voltage is applied to the power transmission electrode 24, AC power is transmitted through capacitive coupling between the power transmission electrode 24 and the power reception electrode 31.

The power reception circuit 32 receives AC power transmitted to the power reception electrode 31 and outputs the AC power to the rectification circuit 33.

The rectification circuit 33 has a circuit configuration having four diode elements connected in a full-bridge form as an example, receives AC power outputted from the power reception circuit 32, and outputs DC power.

The filter 34 is a C filter formed by a capacitor as an example, and attenuates high-frequency components contained in voltage and current outputted from the rectification circuit 33. Depending on the system configuration, a different filter configuration such as an LC filter formed by a capacitor and a reactor may be adopted.

The load 35 consumes power fed from the power reception device 3, and is, for example, a motor, a battery for power storage, or the like. The load 35 may have a load configuration including a power converter for adjusting load voltage. In this case, the load 35 may be provided to the power reception device 3.

Figure 2A:
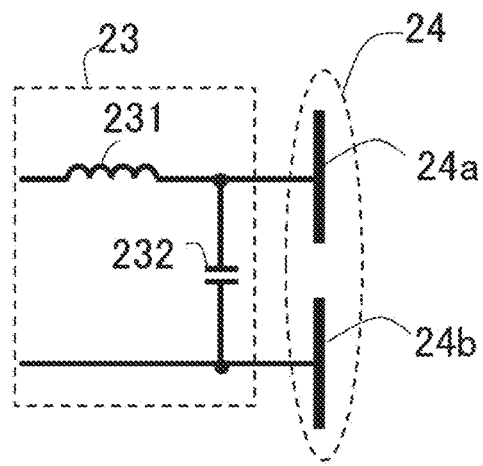
FIG. 2A shows the configuration of a power transmission circuit of the contactless power feeding system according to embodiment 1.
Figure 2B:
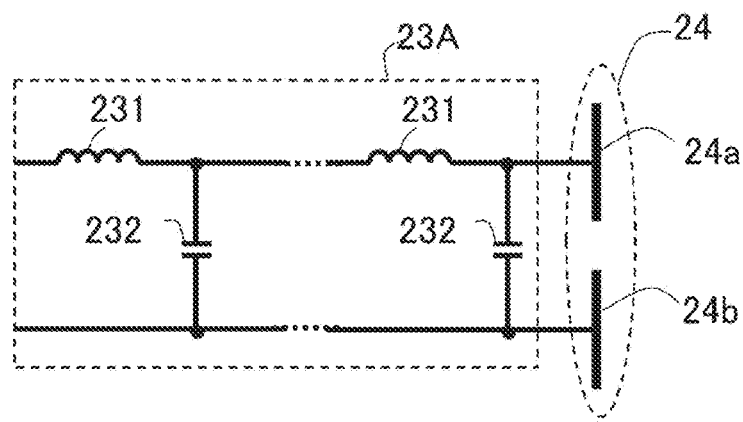
FIG. 2B shows another configuration of the power transmission circuit of the contactless power feeding system according to embodiment 1.

FIG. 2A shows a configuration example of the power transmission circuit 23. In FIG. 2A, the power transmission circuit 23 includes a power-transmission-side resonant inductor 231 and a power-transmission-side resonant capacitor 232. The power transmission electrode 24 is composed of a pair of power transmission electrodes 24a, 24b. The power-transmission-side resonant inductor 231 is connected in series to the power transmission electrodes 24a, 24b, and the power-transmission-side resonant capacitor 232 is connected in parallel to the power transmission electrodes 24a, 24b. In FIG. 2A, a case of having one set of the power-transmission-side resonant inductor 231 and the power-transmission-side resonant capacitor 232 is shown. However, as shown in FIG. 2B, a power transmission circuit 23A having such a configuration that a plurality of sets of power-transmission-side resonant inductors 231 and power-transmission-side resonant capacitors 232 are connected in series, may be used. As in a power transmission circuit 23B shown in FIG. 2C, equally divided power-transmission-side resonant inductors 231 may be connected symmetrically on the upper and lower sides. Without limitation thereto, the power transmission circuit 23 may be any circuit having a resonant configuration that enables capacitive coupling.

Figure 3A:
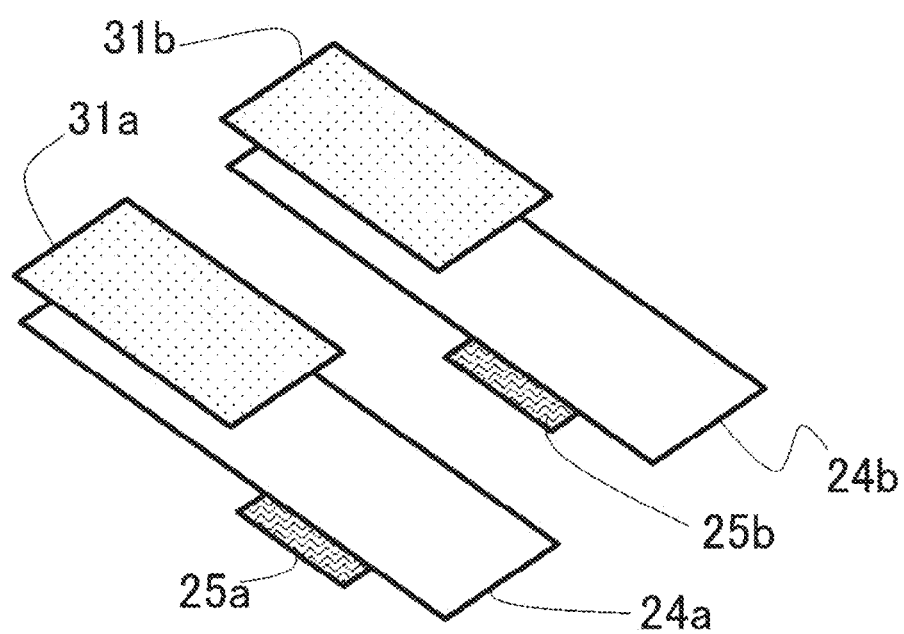
FIG. 3A is a perspective view showing arrangement of a power transmission electrode, a power reception electrode, and a voltage detection electrode in the contactless power feeding system according to embodiment 1.
Figure 3B:
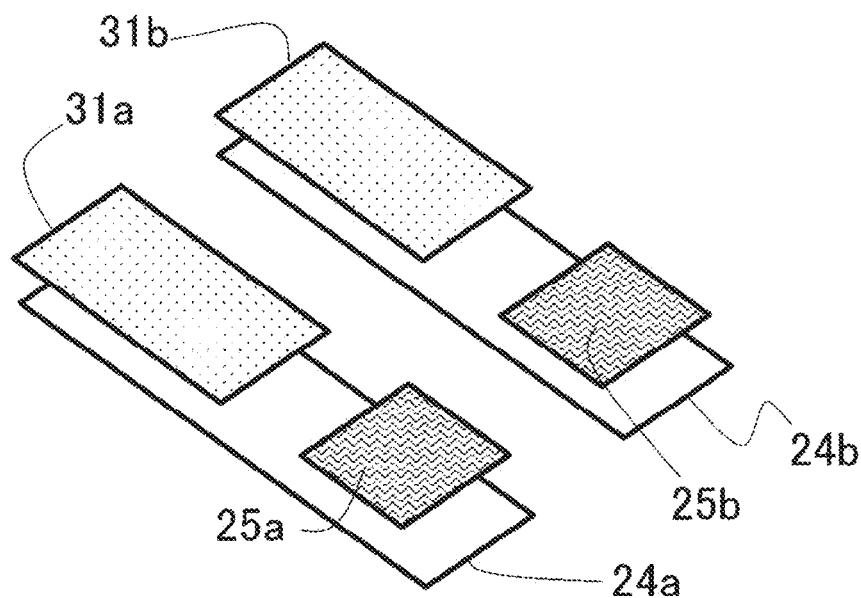
FIG. 3B is a perspective view showing another arrangement of the power transmission electrode, the power reception electrode, and the voltage detection electrode in the contactless power feeding system according to embodiment 1.

FIG. 3A is a perspective view showing arrangement of the power transmission electrode 24, the power reception electrode 31, and the voltage detection electrode 25 in the contactless power feeding system 1 according to embodiment 1. The power transmission electrode 24, the power reception electrode 31, and the voltage detection electrode 25 each have positive and negative electrodes. In FIG. 3A, a positive-side voltage detection electrode 25a is placed so as to be opposed to one surface of the power transmission electrode 24a, and a power reception electrode 31a is placed so as to be opposed to another surface of the power transmission electrode 24. Similarly, a negative-side voltage detection electrode 25b is placed so as to be opposed to one surface of the power transmission electrode 24b, and a power reception electrode 31b is placed so as to be opposed to another surface of the power transmission electrode 24. As shown in FIG. 3A, in a case where the surfaces of the respective electrodes opposed to each other have rectangular shapes, the power transmission electrodes 24a, 24b may have longer shapes than the power reception electrodes 31a, 31b and the voltage detection electrodes 25a, 25b. As shown in FIG. 3B, the voltage detection electrodes 25a, 25b and the power reception electrodes 31a, 31b may be placed so as to be opposed to the same surfaces of the power transmission electrodes 24a, 24b, respectively.

As long as the capacitances between the electrodes are obtained as designed, the sizes, shapes, arrangement, and the like of the power transmission electrode 24, the power reception electrode 31, and the voltage detection electrode 25 are not limited. Using surfaces having rectangular shapes as described above facilitates designing of capacitances.

Figure 4:
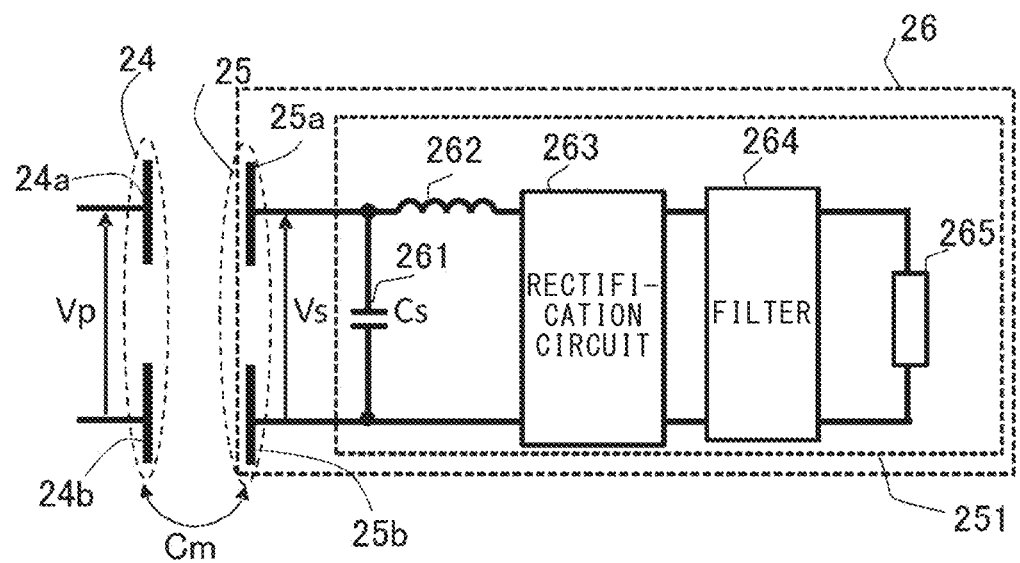
FIG. 4 shows the configuration of a voltage detection unit of the contactless power feeding system according to embodiment 1.

FIG. 4 shows a configuration example of the voltage detection unit 26. The voltage detection circuit 251 includes a resonant capacitor 261 connected in parallel to the voltage detection electrodes 25a, 25b, a resonant inductor 262 connected in series to the voltage detection electrodes 25a, 25b, a rectification circuit 263, a filter 264, and a voltage detection resistor 265. Here, a case of having one set of the resonant capacitor 261 and the resonant inductor 262 is shown. However, as in the power transmission circuit 23A shown in FIG. 2B, such a configuration that a plurality of sets of resonant capacitors 261 and resonant inductors 262 are connected may be used. As in the power transmission circuit 23B shown in FIG. 2C, equally divided resonant inductors 262 may be connected symmetrically on the upper and lower sides.

The rectification circuit 263 has a circuit configuration having four diode elements connected in a full-bridge form as an example, receives AC voltage applied to the voltage detection electrodes 25a, 25b, and outputs DC voltage.

The filter 264 is a C filter formed by a capacitor as an example, and attenuates high-frequency components contained in voltage outputted from the rectification circuit 263. Depending on the system configuration, a different filter configuration such as an LC filter formed by a capacitor and a reactor may be adopted.

DC voltage outputted from the filter 264 is detected by the voltage detection resistor 265.

<Operation of Contactless Power Feeding System 1>

Next, operation of the contactless power feeding system 1 according to the present embodiment will be described.

DC power supplied from the DC power supply 21 of the power transmission device 2 is converted to high-frequency AC power by the power converter 22 and the converted AC power is sent to the power transmission circuit 23. In the power transmission circuit 23, resonant voltage is generated at the power transmission electrode 24 through resonance between the power-transmission-side resonant inductor 231 and the power-transmission-side resonant capacitor 232. By the voltage being applied to the power transmission electrode 24, power is supplied to the power reception device 3 through capacitive coupling between the power transmission electrode 24 and the power reception electrode 31.

As shown in FIG. 4, when voltage is applied to the power transmission electrode 24, voltage Vs is applied to the voltage detection electrode 25 through a coupling capacitance Cm between the power transmission electrode 24 and the voltage detection electrode 25. The voltage Vs applied to the voltage detection electrode 25 has a value obtained by multiplying voltage Vp applied to the power transmission electrode 24 by the ratio of the coupling capacitance Cm between the power transmission electrode 24 and the voltage detection electrode 25 to a capacitance Cs of the resonant capacitor 261 of the voltage detection unit 26. That is, the following relational expression is satisfied.

$$Vs = Vp \times \frac{Cm}{Cs} \quad \text{[Mathematical 1]}$$

DC voltage obtained by rectifying the voltage Vs applied to the voltage detection electrode 25 is detected by the voltage detection resistor 265 and sent to the control unit 27.

Here, if the capacitance Cs of the resonant capacitor 261 of the voltage detection unit 26 is increased relative to the coupling capacitance Cm between the power transmission electrode 24 and the voltage detection electrode 25, voltage detected by the voltage detection resistor 265 becomes low voltage. In a case of detecting high voltage, the voltage detection resistor 265 is configured to have two or more resistors connected in series, whereby DC voltage applied to the voltage detection resistor 265 is divided and detected. However, owing to the above low voltage, such voltage division for detection is not needed. In addition, voltage applied to the resonant capacitor 261 of the voltage detection unit 26 is reduced, so that current hardly flows, and thus the characteristics of the capacitor do not change. Therefore, in power transmission through capacitive coupling between the power transmission electrode 24 and the power reception electrode 31, an influence due to capacitive coupling between the power transmission electrode 24 and the voltage detection electrode 25 can be neglected.

The control unit 27 estimates the impedance of the load 35 and voltage outputted to the load 35 from the voltage detected by the voltage detection resistor 265, and controls output power of the DC power supply 21 so that voltage outputted to the load 35 becomes constant. The control unit 27 performs control so that the voltage detected by the voltage detection unit 26 approaches a target command value. Therefore, by increasing the command value stepwise to target voltage from the start of power supply, it is possible to perform control so as to prevent voltage of the power transmission electrode 24 from sharply increasing.

As described above, according to embodiment 1, in the contactless power feeding system 1 of a capacitive coupling type, the voltage detection electrode 25 is placed so as to be opposed to the power transmission electrode 24, voltage of the power transmission electrode 24 is detected through coupling capacitance between the voltage detection electrode 25 and the power transmission electrode 24, and the load state is estimated. Thus, by controlling input power to the power reception device 3 in accordance with the load state, it becomes possible to properly control power to be supplied to the power reception device 3. In addition, since voltage of the power transmission electrode 24 is detected using capacitive coupling with the voltage detection electrode 25 without directly connecting the voltage detection unit 26 to the power transmission electrode 24, the resonance condition of the power transmission circuit 23 is not influenced.

In addition, the voltage detection circuit 251 connected to the voltage detection electrode 25 is provided as the voltage detection unit 26, and the capacitance Cs of the resonant capacitor 261 provided to the voltage detection circuit 251 is set to be greater than the coupling capacitance Cm between the voltage detection electrode 25 and the power transmission electrode 24, whereby detected voltage can be reduced. Further, since the detected voltage is reduced, it is not necessary to provide a voltage division circuit and therefore device size reduction can be achieved.

Further, since voltage applied to the resonant capacitor is also reduced, the characteristics of the capacitor do not change and thus it becomes possible to detect voltage with high accuracy without variation in the detected voltage.

Embodiment 2

Hereinafter, a contactless power feeding system according to embodiment 2 will be described with reference to the drawings. A difference from embodiment 1 is that the contactless power feeding system 1 according to embodiment 2 includes a plurality of power reception devices 3 and a plurality of loads 35. Hereinafter, the difference from embodiment 1 will be mainly described, while description of the same or corresponding matters as in embodiment 1 is omitted. In embodiment 2, the plurality of power reception devices 3 are equivalent devices.

<Configuration of Contactless Power Feeding System 1>

Figure 5:
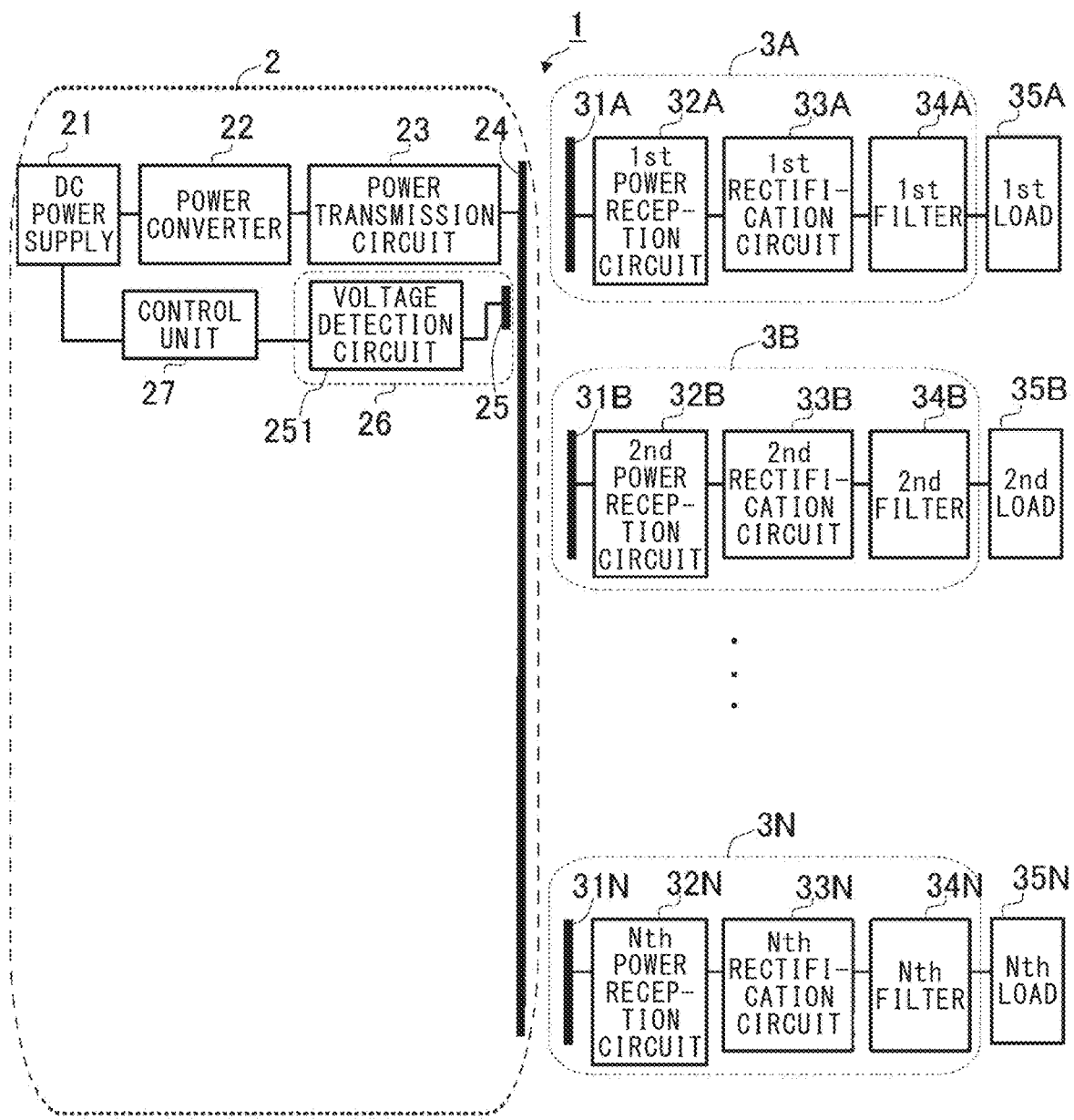
FIG. 5 is a function block diagram showing the configuration of a contactless power feeding system according to embodiment 2.

FIG. 5 is a function block diagram showing the configuration of the contactless power feeding system 1 according to embodiment 2. In the contactless power feeding system 1, respective power reception electrodes 31A, 31B, 31N of power reception devices 3A, 3B, 3N are placed so as to be opposed to one set of power transmission electrodes 24 of the power transmission device 2, and power is fed from one power transmission device 2 to the plurality of power reception devices 3A, 3B, 3N.

Figure 6:
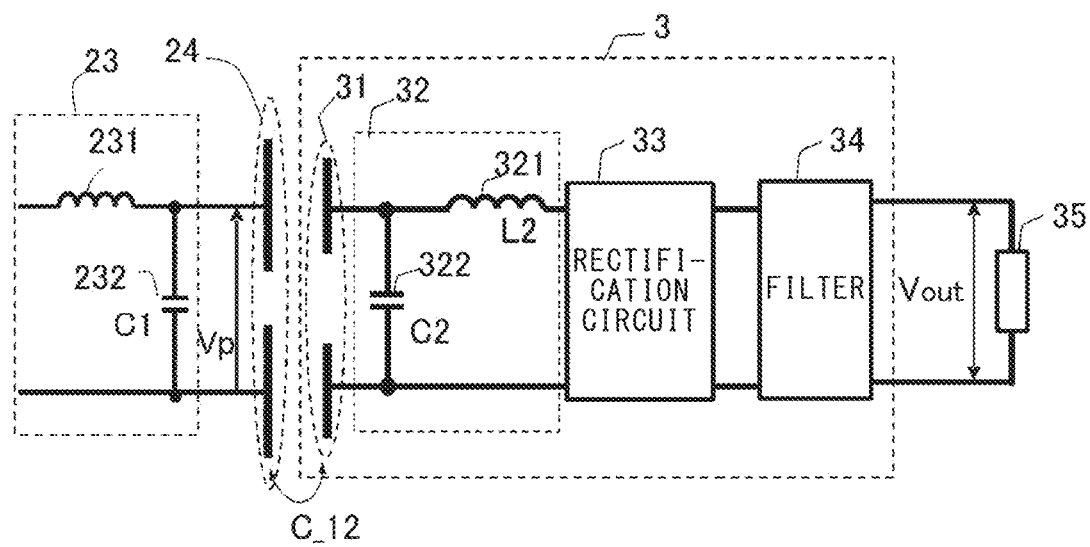
FIG. 6 shows the configuration of a power reception device of the contactless power feeding system according to embodiment 2.

FIG. 6 shows a configuration example of the power reception device 3. The power reception device 3 in FIG. 6 corresponds to any of the power reception devices 3A, 3B, 3N in FIG. 5.

The power reception circuit 32 includes a power-reception-side resonant inductor 321 and a power-reception-side resonant capacitor 322. The power-reception-side resonant inductor 321 and the power-reception-side resonant capacitor 322 are designed as follows. A capacitance C1 of the power-transmission-side resonant capacitor 232, a coupling capacitance C_12 between the power transmission electrode 24 and the power reception electrode 31, an inductance L2 of the power-reception-side resonant inductor 321, a capacitance C2 of the power-reception-side resonant capacitor 322, and a frequency f of transmission power have the following relationship.

$$2\pi f = \frac{1}{\sqrt{L_2\left(C_2 - \frac{C_{-12}}{C_1}\right)}} \quad \text{[Mathematical 2]}$$

With the above relationship established, voltage Vout outputted to the load 35 is represented using voltage Vp applied to the power transmission electrode 24, the capacitance C1 of the power-transmission-side resonant capacitor 232, the coupling capacitance C_12 between the power transmission electrode 24 and the power reception electrode 31, and the capacitance C2 of the power-reception-side resonant capacitor 322, by the following expression.

$$Vout = \frac{C_{-12}}{C_2 - \frac{C_{-12}}{C_1}} \times Vp \quad \text{[Mathematical 3]}$$

Therefore, the voltage Vp of the power transmission electrode 24 and the voltage Vout outputted to the load 35 do not change depending on the impedance of the load 35.

Figure 2C:
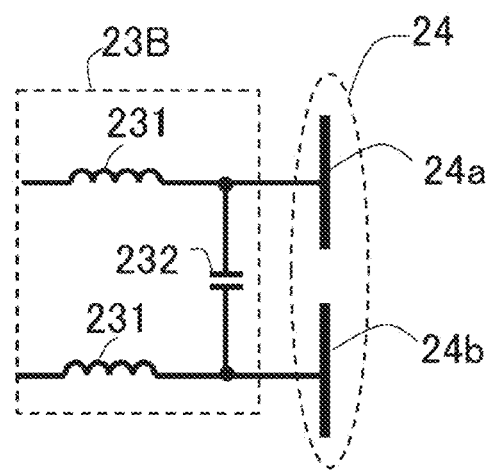
FIG. 2C shows still another configuration of the power transmission circuit of the contactless power feeding system according to embodiment 1.

As in the power-transmission-side resonant inductors 231 of the power transmission circuit shown in FIG. 2C, equally divided power-reception-side resonant inductors 321 may be connected symmetrically on the upper and lower sides. Here, a case of having one set of the power-reception-side resonant inductor 321 and the power-reception-side resonant capacitor 322 is shown. However, as in the power transmission circuit shown in FIG. 2B, such a configuration that a plurality of sets of power-transmission side resonant inductors 231 and power-transmission side resonant capacitors 232 are connected, may be used.

The rectification circuit 33 has a configuration having four diode elements connected in a full-bridge form as an example, receives AC power outputted from the power reception circuit 32, and outputs DC power.

The filter 34 is a C filter formed by a capacitor as an example, and attenuates high-frequency components contained in voltage and current outputted from the rectification circuit 33. Depending on the system configuration, a different filter configuration such as an LC filter formed by a capacitor and a reactor may be adopted.

The load 35 consumes power fed from the power reception device 3, and is, for example, a motor, a battery for power storage, or the like. The load 35 may have a load configuration including a power converter for adjusting load voltage. In this case, the load 35 may be provided to the power reception device 3.

<Operation of Contactless Power Feeding System 1>

Next, operation of the contactless power feeding system 1 according to embodiment 2 will be described.

DC power supplied from the DC power supply 21 of the power transmission device 2 is converted to high-frequency AC power by the power converter 22 and the converted AC power is sent to the power transmission circuit 23. In the power transmission circuit 23, resonant voltage is generated at the power transmission electrode 24 through resonance between the power-transmission-side resonant inductor 231 and the power-transmission-side resonant capacitor 232. By the voltage being applied to the power transmission electrode 24, power is supplied to each power reception device 3 through capacitive coupling between the power transmission electrode 24 and the power reception electrode 31 of each power reception device 3.

The control unit 27 performs control so that the voltage Vs detected by the voltage detection unit 26 has a value obtained by multiplying the voltage Vout outputted to the load 35 by the ratio of the capacitance C2 of the power-reception-side resonant capacitor to the capacitance Cs of the resonant capacitor 261 of the voltage detection unit 26. That is, the control unit 27 controls the output voltage of the DC power supply 21 so as to satisfy the following expression.

$$Vs = Vout \times \frac{C2}{Cs} \qquad \text{[Mathematical 4]}$$

By the control unit 27 controlling the voltage Vs as described above, with equivalent power reception devices 3 and loads 35 connected, it becomes possible to make the voltages outputted to the loads 35 constant irrespective of the load states of the loads 35.

Conventionally, for a plurality of power reception devices 3, in order to keep output voltages to the loads 35 constant, it is necessary that, using expensive optical sensors or high-frequency sensors, the number of power reception devices 3 fed with power from the power transmission device 2 is recognized and power control or control for switching a plurality of impedance matching circuits is performed in accordance with the number of the power reception devices 3. However, according to embodiment 2, such additional components and additional circuits are not needed, and even if the number of power reception devices 3 is changed, the voltages outputted to the loads 35 from all the power reception devices 3 fed with power from one power transmission device 2 can be kept constant.

As described above, according to embodiment 2, the contactless power feeding system 1 of a capacitive coupling type has a configuration for transmitting power to a plurality of equivalent power reception devices 3, and includes the voltage detection circuit 251 connected to the voltage detection electrode 25 as the voltage detection unit 26. The voltage detection electrode 25 is placed so as to be opposed to the power transmission electrode 24, to detect voltage of the power transmission electrode 24 through coupling capacitance between the voltage detection electrode 25 and the power transmission electrode 24, and input power to the power reception device 3 is controlled using the ratio of the capacitance C2 of the power-reception-side resonant capacitor to the capacitance Cs of the resonant capacitor 261 provided to the voltage detection circuit 251. Thus, in addition to the effects of embodiment 1, for a plurality of power reception devices 3, it becomes possible to make voltages outputted to the loads 35 constant irrespective of the load states of the loads 35.

Other Embodiments

In the above embodiments 1 and 2, the control unit 27 controls output power of the DC power supply 21. Alternatively, the control unit 27 may control output power of the power converter 22 so that voltage outputted to the load 35 becomes constant, on the basis of the voltage detected by the voltage detection unit 26. In this case, the DC power supply 21 may output DC voltage obtained by rectifying AC 200 V from the grid, for example. The DC power supply 21 may be a power storage device.

In the above embodiments 1 and 2, AC voltage is applied from the power converter 22 to the power transmission electrode 24 via the power transmission circuit 23. However, AC voltage may be directly applied from the power converter 22 to the power transmission electrode 24.

In the above embodiment 1, description of the details of the power reception device 3 is omitted. However, it should be understood that the power reception device 3 shown in FIG. 6 in embodiment 2 can be applied to embodiment 1.

Figure 7:
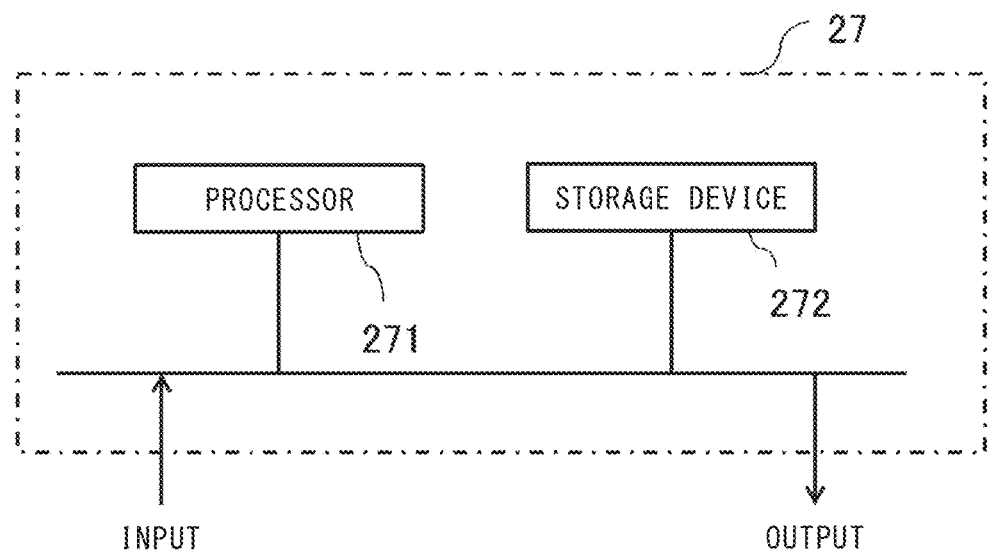
FIG. 7 is a hardware configuration diagram of a control unit of the contactless power feeding system according to each of embodiments 1 and 2.

The control unit 27 is composed of a processor 271 and a storage device 272 as shown in FIG. 7 which shows an example of hardware thereof. Although not shown, the storage device is provided with a volatile storage device such as a random access memory and a nonvolatile auxiliary storage device such as a flash memory. Instead of the flash memory, an auxiliary storage device of a hard disk may be provided. The processor 271 executes a program inputted from the storage device 272. In this case, the program is inputted from the auxiliary storage device to the processor 271 via the volatile storage device. The processor 271 may output data such as a calculation result to the volatile storage device of the storage device 272 or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 contactless power feeding system
2 power transmission device
3, 3A, 3B, 3N power reception device
21 DC power supply
22 power converter
23, 23A, 23B power transmission circuit
24, 24a, 24b power transmission electrode
25, 25a, 25b voltage detection electrode
26 voltage detection unit
27 control unit
31, 31a, 31b, 31A, 31B, 31N power reception electrode
32, 32A, 32B, 32N power reception circuit
33, 33A, 33B, 33N rectification circuit
34, 34A, 34B, 34N filter
35, 35A, 35B, 35N load
231 resonant inductor
232 resonant capacitor
251 voltage detection circuit
261 resonant capacitor
262 resonant inductor
263 rectification circuit
264 filter
265 voltage detection resistor
271 processor
272 storage device
321 resonant inductor
322 resonant capacitor

The invention claimed is:

1. A power transmission device for supplying power in a contactless manner to a power reception device having a power reception electrode, the power transmission device comprising:
a DC power supply to output DC power;
a power converter to convert the DC power outputted from the DC power supply to AC power;

a power transmission electrode to receive the AC power converted by the power converter;
a voltage detector to detect a voltage of the power transmission electrode; and
a controller to control the DC power supply or the power converter on the basis of the voltage detected by the voltage detector, wherein
power is supplied to the power reception device through capacitive coupling between the power transmission electrode and the power reception electrode, and
the voltage detector has a voltage detection electrode and a capacitor connected in parallel with the voltage detection electrode,
a capacitance of the capacitor connected in parallel with the voltage detection electrode is greater than a coupling capacitance between the voltage detection electrode and the power transmission electrode, and
the voltage detector detects the voltage of the power transmission electrode through capacitive coupling between the power transmission electrode and the voltage detection electrode.

2. The power transmission device according to claim 1, wherein the controller controls the DC power supply or the power converter so that the voltage detected by the voltage detector is kept at a constant value.

3. The power transmission device according to claim 1, further comprising a power transmission circuit between the power converter and the power transmission electrode, wherein
the power transmission circuit has a resonant inductor and a resonant capacitor, and
the power transmission circuit receives the AC power from the power converter and generates a resonant voltage at the power transmission electrode by the resonant inductor and the resonant capacitor.

4. A contactless power feeding system comprising:
a DC power supply to output DC power;
a power converter to convert the DC power outputted from the DC power supply to AC power;
a power transmission electrode to receive the AC power converted by the power converter;
a power reception device which has a power reception electrode placed opposite to the power transmission electrode, and which receives power through capacitive coupling between the power transmission electrode and the power reception electrode and feeds power to a load;
a voltage detector to detect a voltage of the power transmission electrode; and
a controller to control the DC power supply or the power converter on the basis of the voltage detected by the voltage detector,
wherein the voltage detector has a voltage detection electrode and a capacitor connected in parallel with the voltage detection electrode,
a capacitance of the capacitor connected in parallel with the voltage detection electrode is greater than a coupling capacitance between the voltage detection electrode and the power transmission electrode, and
the voltage detector detects the voltage of the power transmission electrode through capacitive coupling between the power transmission electrode and the voltage detection electrode.

5. The contactless power feeding system according to claim 4, wherein the controller controls the DC power supply or the power converter so that the voltage detected by the voltage detector is kept at a constant value.

6. The contactless power feeding system according to claim 4, further comprising a power transmission circuit between the power converter and the power transmission electrode, wherein
the power transmission circuit has a resonant inductor and a resonant capacitor, and
the power transmission circuit receives the AC power from the power converter and generates a resonant voltage at the power transmission electrode by the resonant inductor and the resonant capacitor.

7. The contactless power feeding system according to claim 4, wherein
the power reception device includes a power reception circuit including a capacitor connected in parallel to the power reception electrode, and
the controller controls the DC power supply or the power converter to satisfy the following expression:

$$Vs = Vout \times \frac{C2}{Cs} \qquad \text{[Mathematical 5]}$$

where Vs is the voltage detected by the voltage detector, Vout is a voltage fed to the load, Cs is a capacitance of the capacitor of the voltage detector, and C2 is a capacitance of the capacitor of the power reception circuit.

8. The contactless power feeding system according to claim 7, comprising a plurality of the power reception devices, wherein with the respective power reception electrodes of the plurality of power reception devices capacitive-coupled to one set of the power transmission electrodes, power is supplied to each of the power reception devices.

9. The contactless power feeding system according to claim 5, further comprising a power transmission circuit between the power converter and the power transmission electrode, wherein
the power transmission circuit has a resonant inductor and a resonant capacitor, and
the power transmission circuit receives the AC power from the power converter and generates a resonant voltage at the power transmission electrode by the resonant inductor and the resonant capacitor.

10. The contactless power feeding system according to claim 5, wherein
the power reception device includes a power reception circuit including a capacitor connected in parallel to the power reception electrode, and
the controller controls the DC power supply or the power converter to satisfy the following expression:

$$Vs = Vout \times \frac{C2}{Cs} \qquad \text{[Mathematical 5]}$$

where Vs is the voltage detected by the voltage detector, Vout is a voltage fed to the load, Cs is a capacitance of the capacitor of the voltage detector, and C2 is a capacitance of the capacitor of the power reception circuit.

11. The contactless power feeding system according to claim 6, wherein
the power reception device includes a power reception circuit including a capacitor connected in parallel to the power reception electrode, and the controller controls the DC power supply or the power converter to satisfy the following expression:

$$Vs = Vout \times \frac{C2}{Cs} \quad \text{[Mathematical 5]}$$

where Vs is the voltage detected by the voltage detector, Vout is a voltage fed to the load, Cs is a capacitance of the capacitor of the voltage detector, and C2 is a capacitance of the capacitor of the power reception circuit.

12. The contactless power feeding system according to claim 9, wherein
the power reception device includes a power reception circuit including a capacitor connected in parallel to the power reception electrode, and
the controller controls the DC power supply or the power converter to satisfy the following expression:

$$Vs = Vout \times \frac{C2}{Cs} \quad \text{[Mathematical 5]}$$

where Vs is the voltage detected by the voltage detector, Vout is a voltage fed to the load, Cs is a capacitance of the capacitor of the voltage detector, and C2 is a capacitance of the capacitor of the power reception circuit.

13. The contactless power feeding system according to claim 10, comprising a plurality of the power reception devices, wherein with the respective power reception electrodes of the plurality of power reception devices capacitive-coupled to one set of the power transmission electrodes, power is supplied to each of the power reception devices.

14. The contactless power feeding system according to claim 11, comprising a plurality of the power reception devices, wherein with the respective power reception electrodes of the plurality of power reception devices capacitive-coupled to one set of the power transmission electrodes, power is supplied to each of the power reception devices.

15. The contactless power feeding system according to claim 12, comprising a plurality of the power reception devices, wherein with the respective power reception electrodes of the plurality of power reception devices capacitive-coupled to one set of the power transmission electrodes, power is supplied to each of the power reception devices.

16. The power transmission device according to claim 2, further comprising a power transmission circuit between the power converter and the power transmission electrode, wherein
the power transmission circuit has a resonant inductor and a resonant capacitor, and
the power transmission circuit receives the AC power from the power converter and generates a resonant voltage at the power transmission electrode by the resonant inductor and the resonant capacitor.

17. The power transmission device according to claim 1, wherein the power converter is one of a class-E inverter and an inverter including a bridge circuit.

18. The power transmission device according to claim 6, wherein the power transmission electrode includes two electrodes, each connected to a respective end of the resonant capacitor of the power transmission circuit.

19. The contactless power feeding system according to claim 4, wherein the load is a motor or a battery.

20. The power transmission device according to claim 1, wherein the voltage detector includes a resonant circuit connected to the voltage detection electrode, a rectifier connected to the resonant circuit, a filter connected to the rectifier circuit, and a voltage detection resistor connected to the filter, a voltage across the voltage detection resistor being a voltage detection result of the voltage detector.

* * * * *